United States Patent
O'Halloran

[11] 3,850,534
[45] Nov. 26, 1974

[54] CHAIR CONNECTOR

[76] Inventor: Robert W. O'Halloran, 1146 Harrison St., Hollywood, Fla. 33020

[22] Filed: Dec. 7, 1972

[21] Appl. No.: 312,924

[52] U.S. Cl................................ 403/190, 403/264
[51] Int. Cl............................................... F16b 7/00
[58] Field of Search .......... 403/190, 191, 264, 289; 52/758 H; 24/73 P, 73 PF, 73 AP, 73 PM, 73 SM

[56] References Cited
UNITED STATES PATENTS

| 589,950 | 9/1897 | Temple | 403/264 X |
| 1,404,522 | 1/1922 | Harris | 403/190 |
| 2,257,979 | 10/1941 | Rubinstein | 403/289 X |
| 3,598,433 | 8/1971 | Savickas | 403/190 |

Primary Examiner—Werner H. Schroeder
Attorney, Agent, or Firm—Malin & Haley

[57] ABSTRACT

A plastic chair having a plurality of tubular members connected together by a chair connecting means. The connecting means includes locking means, a pin, and a tube fitting. The tube fitting includes an inner connecting portion and an outer abutting portion. The inner connecting portion is welded in the end of one tubular member. The abutting extension is integrally connected at a 90° angle to a second tubular member by the locking means. The locking means may be fixed to the pin or the tube fitting to lock the tube fitting in engagement with the second tubular member.

2 Claims, 4 Drawing Figures

PATENTED NOV 26 1974 3,850,534
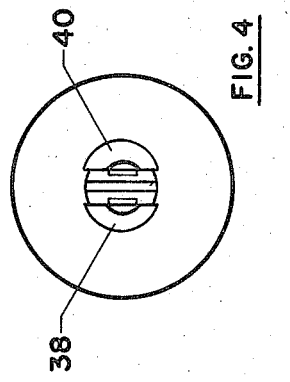
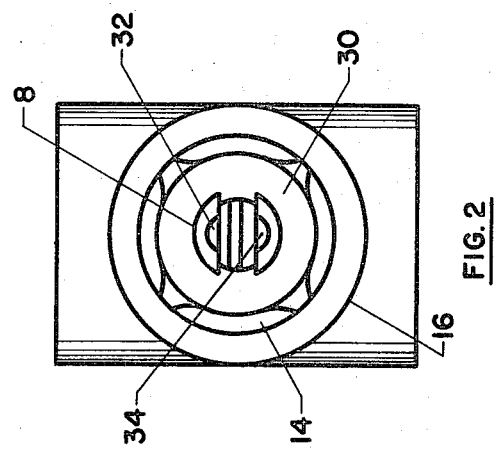
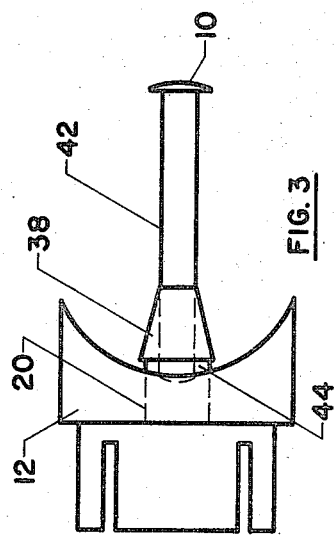
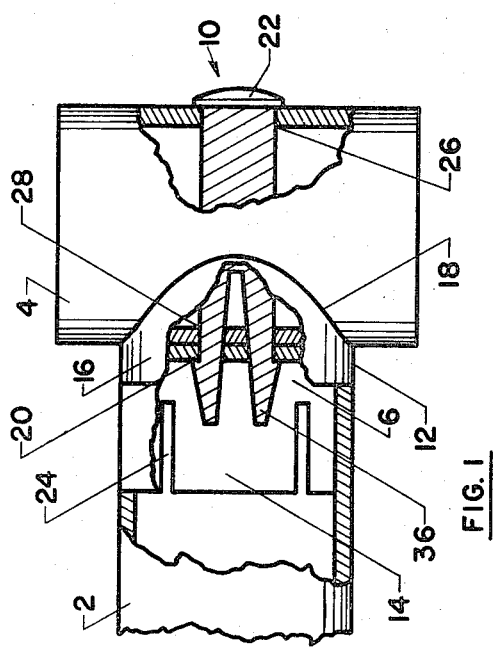

CHAIR CONNECTOR

BACKGROUND OF THE INVENTION

The invention relates to a new and improved chair connector. In the past, tubular members were connected together by screws that were placed in one tube and screwed into a fitting secured in the end of a second tube. The placement of the screws in the tube and the screw operation often scarred the finish on the tubular members.

BRIEF DESCRIPTION OF THE INVENTION

A chair connecting means for connecting a plurality of tubular members together. The connecting means includes a locking means, a pin and a tube fitting. The tube fitting includes an inner connecting portion having an outside diameter equal to the inside diameter of a first tubular member, and an outer abutting extension having an outside diameter equal to the outside diameter of the first tubular member. The outside abutting portion has a distal end shaped to integrally connect the tube fitting, at a ninety degree angle, to a second tubular member. The tube fitting includes an axial opening therethrough for holding or securing the locking means. The pin has a head at one end, a tube fitting engaging portion at the distal end thereof, and a body member to bridge the distance across the second tubular member between the tube fitting and the head on opposite sides of the second tubular member. The locking means may be attached to the distal end of the pin or in the opening of the tube fitting.

It is an object of this invention to provide a non-complex snap on locking means for plastic furniture.

BRIEF DESCRIPTION OF THE DRAWING

In the drawing:

FIG. 1 is a side view, partially broken away, of two tubular members connected together by a connecting means with a locking means on the distal end of the pin;

FIG. 2 is an end view of the connecting means as shown in FIG. 1 with the first tube 2 removed;

FIG. 3 is a side view of a portion of the tubular fitting with the locking means attached thereto and a portion of a pin with a sharp distal end.

FIG. 4 is an end view of the portion of the tubular fitting shown in FIG. 3.

DESCRIPTION OF THE PREFERRED EMBODIMENT

A plurality of tubular members 2 and 4 are connected together by connecting means 6. The connecting means 6 includes locking means 8, a pin 10, and a tube fitting 12. The tube fitting 12 includes an inner connecting portion 14 and an outer abutting extension 16. The inner connecting portion has an outside diameter equal to the inside diameter of the first tubular member 2 and is welded in the end of said first tubular member 2. The abutting extension has an outside diameter equal to the outside diameter of the first tubular member and a distal end shaped, as illustrated by numeral 18, integrally connecting the first tubular member at a ninety degree angle to the second tubular member 4. The tube fitting also has an opening 20 through the longitudinal axis of the tube fitting. The pin has a head 22 at one end, a body member sized to connect the head on one side of the second tubular member 4 to the tube fitting on the other side of the second tubular member 4, and an engaging portion at the other distal end to engage the tube fitting. The locking means, as shown in FIGS. 1 and 2, may be attached to the distal end of the pin, that is, to the distal end of the outer abutting extension to secure the first tubular member 2, and the tube fitting 12 to the second tubular member 4.

The inner connecting portion 14 of the tube fitting 12 is slotted, as illustrated by numeral 24 to allow the innerconnecting portion 14 to easily move into the end of tube 2. The slots also allow movement of the solid portion of the distal end of the inner connecting portion 14 against the inside of tube 2 to hold the tube fitting in place in the first tubular member 2 during the welding process. The outer diameter of the tube fitting matches the outer diameter of tube 2 to provide a continuous smooth outer surface. As illustrated in FIGS. 1 and 2 the tube fitting abutts tube 4 to provide a smooth connecting line 18.

Openings 26 and 28 are drilled through tube 4. The openings are positioned to allow pin 10 to move through opening 26, through tube opening 28 and into and through opening 20 in the tube fitting. The locking means when located at the end of the pin and moved through opening 20, will snap outwardly into engagement with the inner surface 30 of the inner connecting portion 14 of the tube fitting 12. The locking means is a split arrow-shaped member 8 including two arrowhead portions 32 and 34. As the arrowheads move through the openings 26, 28 and 20 the two split portions move together allowing the pin to proceed through the holes. As the arrowheads reach the end of opening 20, the resilient split arms 36, will move apart to snap-lock the pin in place.

Referring now to FIGS. 3 and 4, illustrating the tube fitting with the locking means 38 connected in the opening 20 of the tube fitting 12, the tube fitting 12 is pushed against tube 4, not shown, to snap-lock tube fitting 12 in place against tube 4. The split arrow-head 38 & 40 with connecting arms 44 moves through opening 28 in tube 4, not shown. The pin 10 having a split end as illustrated in FIG. 4 is moved through tube 4 to permanently lock the locking means in an open position.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A device for connecting together a first tubular member to a second tubular member at a substantially perpendicular angle comprising:

a cylindrical member having a first end portion and a second end portion, said first end portion having a smaller circumferential exterior diameter than said second end portion, said second end portion having a surface configuration curved and adapted to receive and abut against said second tubular exterior surface, said cylindrical member having a transverse wall coupled across said second cylindrical member end portion opening, said transverse wall having an aperture disposed substantially in a central portion, and a locking pin, said pin having a first end having a flanged enlarged diametrially end portion, and a second end having a bifurcated tapered end portion, said bifurcating end portions being resilient and receivable through said cylindrical member transverse wall aperture, said bifurcated end portions having flanged circumferential diameter portions which are engageable within said cylindrical member transverse wall aperture whereby said second tubular member may be lockably engaged to said cylindrical member with the bifurcated second end portion of said pin positioned within said transverse wall aperture portion.

2. Tubular connecting device, as in claim 1, wherein:

said cylindrical member first end having a smaller circumferential diameter and has a plurality of longitudinal slots disposed from the second end portion and arranged axially relative to said cylindrical member axis.

* * * * *